(No Model.)  2 Sheets—Sheet 1.
P. & C. SCHEIDT.
VEHICLE SPRING.
No. 346,225. Patented July 27, 1886.
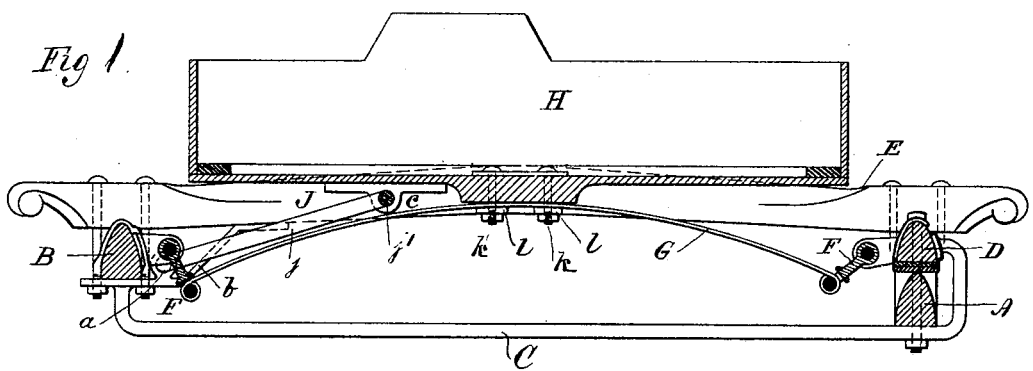
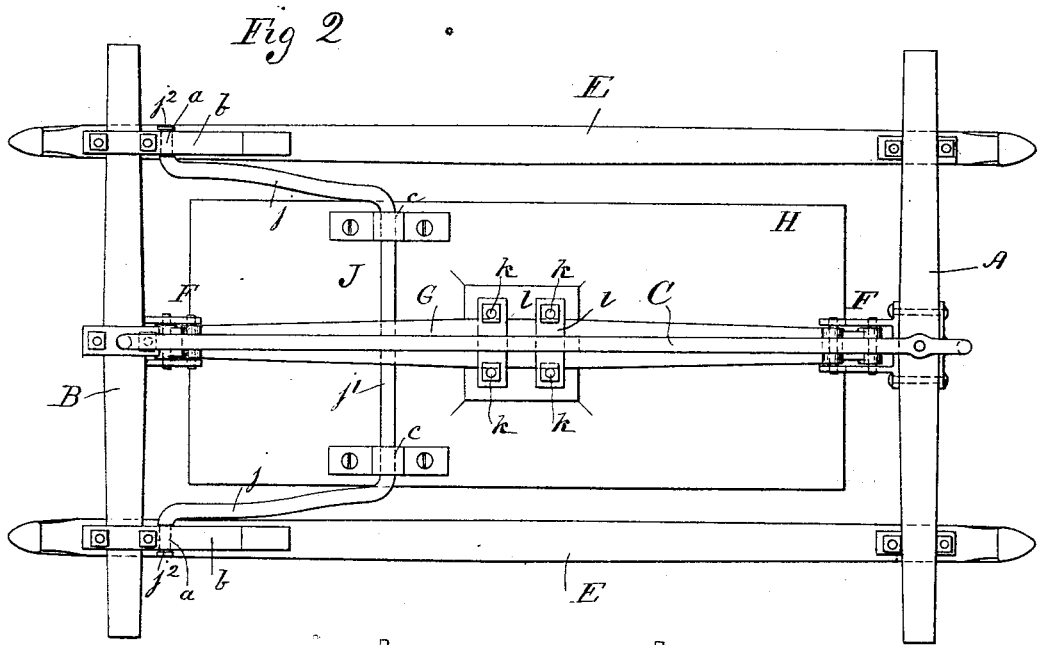
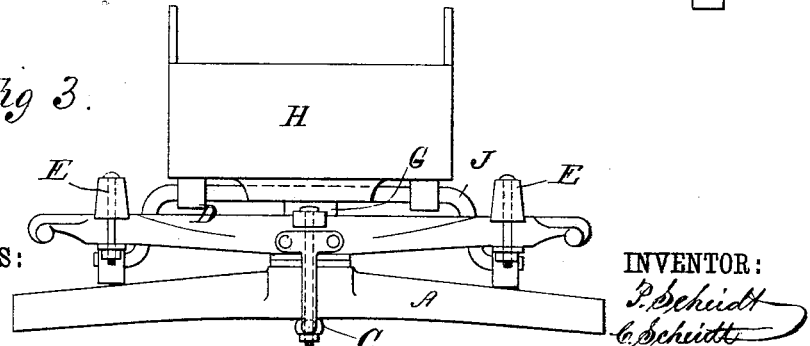
WITNESSES:
J. Cook
C. Sedgwick
INVENTOR:
P. Scheidt
C. Scheidt
BY Munn & Co.
ATTORNEYS.

(No Model.) 2 Sheets—Sheet 2.
P. & C. SCHEIDT.
VEHICLE SPRING.
No. 346,225. Patented July 27, 1886.
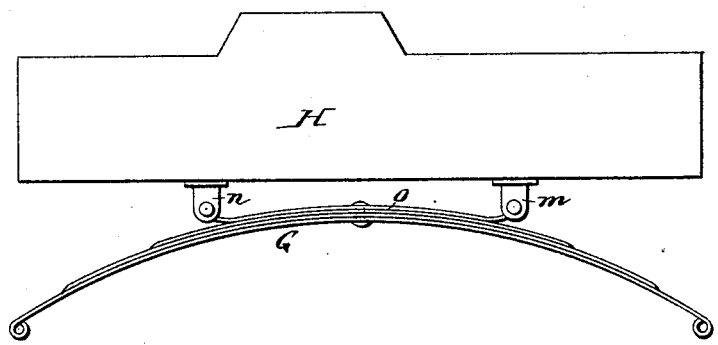
WITNESSES:
INVENTOR:
P. Scheidt
C. Scheidt
BY Munro & Co
ATTORNEYS.

UNITED STATES PATENT OFFICE.

PETER SCHEIDT AND CHARLES SCHEIDT, OF SARANAC, MICHIGAN.

VEHICLE-SPRING.

SPECIFICATION forming part of Letters Patent No. 346,225, dated July 27, 1886.

Application filed August 17, 1885. Serial No. 174,623. (No model.)

*To all whom it may concern:*

Be it known that we, PETER SCHEIDT and CHARLES SCHEIDT, of Saranac, in the county of Ionia and State of Michigan, have invented a new and Improved Four-Wheeled Vehicle, of which the following is a full, clear, and exact description.

Reference is to be had to the accompanying drawings, forming a part of this specification, in which similar letters of reference indicate corresponding parts in all the figures.

Figure 1 is a sectional elevation of our new and improved vehicle, the wheels not being shown. Fig. 2 is an inverted plan view of the same. Fig. 3 is a front elevation of the same, and Fig. 4 is a side view showing a modification in the attachment of the spring to the body.

Our invention relates to improvements in that class of four-wheeled vehicles in which a single spring is employed for supporting the body; and the invention consists of the construction, arrangement, and combination of parts, all as hereinafter described and claimed.

Referring to the drawings, A represents the front and B the rear axle. These are connected by the reach C, arranged in an ordinary or in any approved manner.

Upon the front axle, A, is placed the bolster D, which is connected with the rear axle, B, by the side bars, E E. The bolster D and rear axle, B, are each provided with a shackle, F, to which the ends of the spring G are secured. The spring G in this instance is a flat upwardly-curved spring, and has the box or body H of the vehicle placed upon and secured to it by suitable bolts and plates, $k$ $l$, so that the box is securely held and supported by the spring.

J is the bail-shaped equalizer. This is a rod of iron bent to form the arms $j$ $j$, central portion, $j'$, and the wrists $j^2$ $j^2$, which latter are journaled in the boxes $a$ $a$, formed upon or secured to the irons $b$ $b$, which brace the side bars, E, to the rear axle, B. The central portion, $j'$, of the equalizer J is journaled in the boxes $c$ $c$, secured to the bottom of the box or body H, as shown clearly in Figs. 1 and 2, so that when the box and spring are depressed both sides of the box must be depressed equally, whether the load is located in the center of the box or not.

Instead of using the bolts and plates $k$ $l$ for securing the body H to the spring G, we may use the two clips $m$ $n$, to which the ends of an upper leaf, $o$, of the spring may be secured, the clips being secured by bolts or rivets to the bottom of the body, as shown clearly in Fig. 4.

Constructed in the manner described, the vehicle is practical in all respects, and is very cheap and durable.

Having thus described our invention, we claim as new and desire to secure by Letters Patent—

1. In a four-wheeled vehicle, the combination, with the body H, the rear axle, B, the bolster D, the shackles F on the axle and bolster, and the spring G, secured at the center of its length to the under side of the body, and having its ends connected to the said shackles, of the bail-shaped equalizer J, having its middle portion pivoted to the under side of the body in rear of the attachment of the spring, and its ends pivoted to the forward side of the rear axle, substantially as herein shown and described.

2. In a four-wheeled vehicle, the combination, with the body H, the rear axle, B, the bolster D, the reach C, the side bars, E, the shackles, and the spring G, having its middle portion secured to the under side of the body and its ends to the shackles, of the bail-shaped equalizer J, having its middle portion pivoted to the under side of the body in rear of the attachment of the spring, and its ends secured in boxes $a$ on the irons $b$, that secure the bars E to the rear axle, substantially as herein shown and described.

PETER SCHEIDT.
CHARLES SCHEIDT.

Witnesses:
CHAS. E. MERCER,
A. F. NOYES.